United States Patent [19]

Casler et al.

[11] 4,368,931
[45] Jan. 18, 1983

[54] SELF ALIGNING PRESS IN BEARING STRUCTURES

[75] Inventors: William A. Casler; Phillip E. Saurenman, both of Pasadena, Calif.

[73] Assignee: Plus Manufacturing Co., Inc., South El Monte, Calif.

[21] Appl. No.: 171,729

[22] Filed: Jul. 24, 1980

[51] Int. Cl.³ .............................................. F16C 25/04
[52] U.S. Cl. ................... 384/192; 29/149.5 B
[58] Field of Search .................... 308/72, 194; 29/149.5 B, 149.5 DP

[56] References Cited

U.S. PATENT DOCUMENTS

| | | | |
|---|---|---|---|
| 2,609,253 | 9/1952 | Brown | 308/72 |
| 2,919,150 | 12/1959 | Baker | 29/149.5 B |
| 3,004,803 | 10/1961 | Irwin | 308/72 |
| 3,302,048 | 1/1967 | Gray | 308/72 |
| 3,439,964 | 4/1969 | Stone et al. | 308/72 |
| 4,014,596 | 3/1977 | Kazama | 308/72 |
| 4,163,419 | 8/1979 | Molitorisz | 308/72 |
| 4,183,590 | 1/1980 | Lower | 308/72 |

FOREIGN PATENT DOCUMENTS 2648337  5/1977  Fed. Rep. of Germany ........ 308/72

Primary Examiner—Richard R. Stearns
Attorney, Agent, or Firm—Donald D. Mon

[57] ABSTRACT

Self-aligning press-in bearing structures in which a bearing and a receptacle are engaged to one another so as to permit the bearing axis to make a minor angular accommodation to conform to a shaft axis. The bearing and the receptacle have matching non-circular surfaces with a limited axial extent to permit this accommodation. A method for making this assembly includes an off-axis gyration of the bearing or of the receptacle.

16 Claims, 8 Drawing Figures

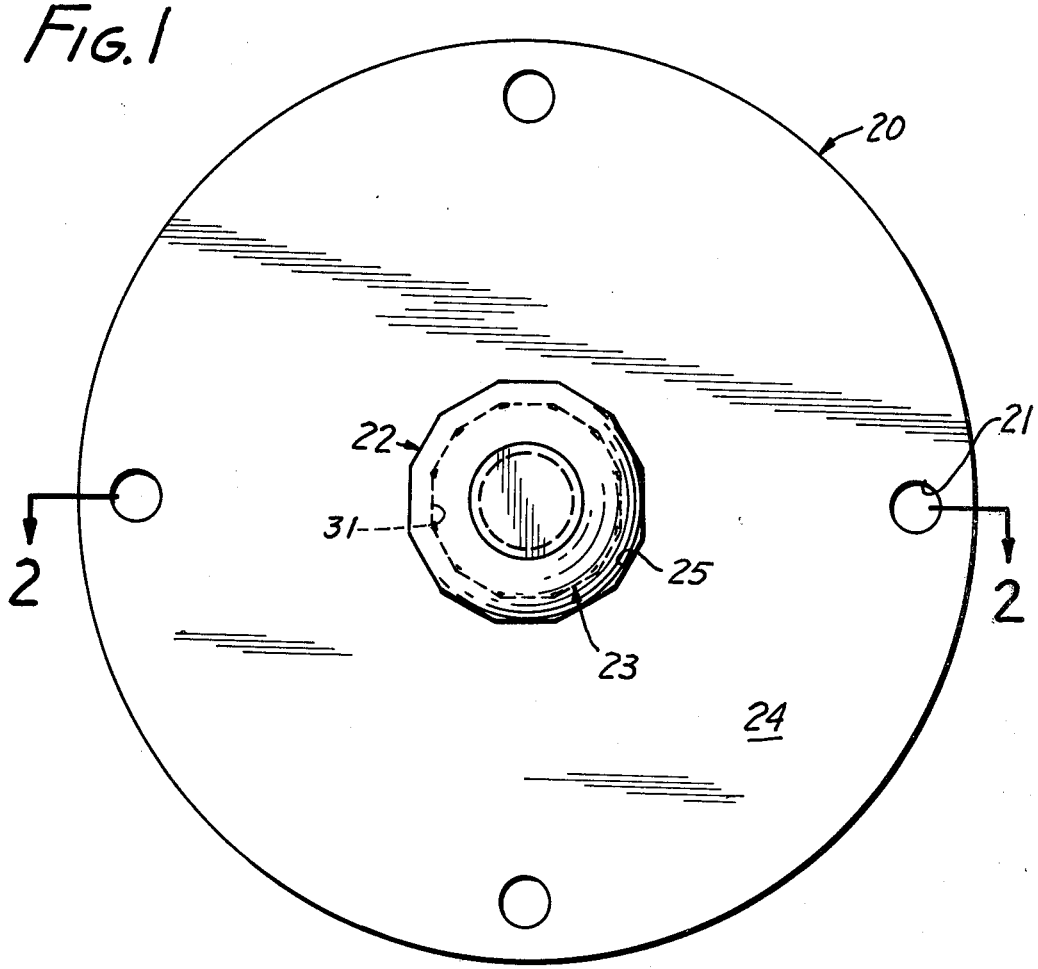
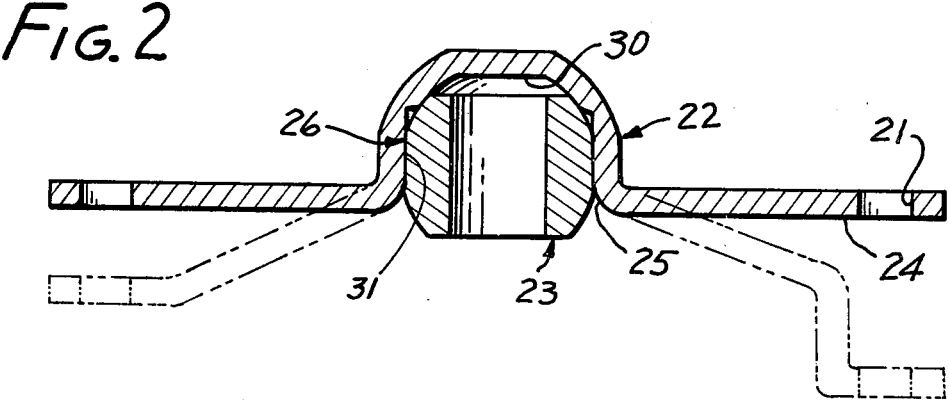
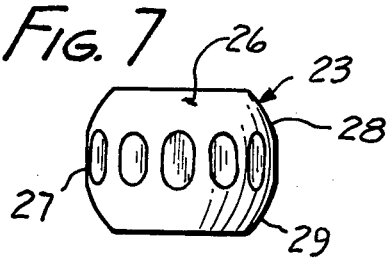
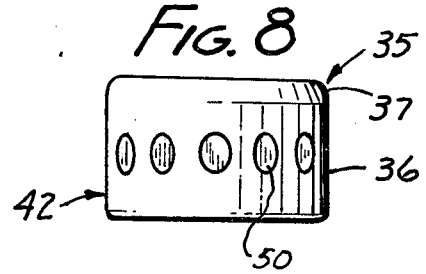

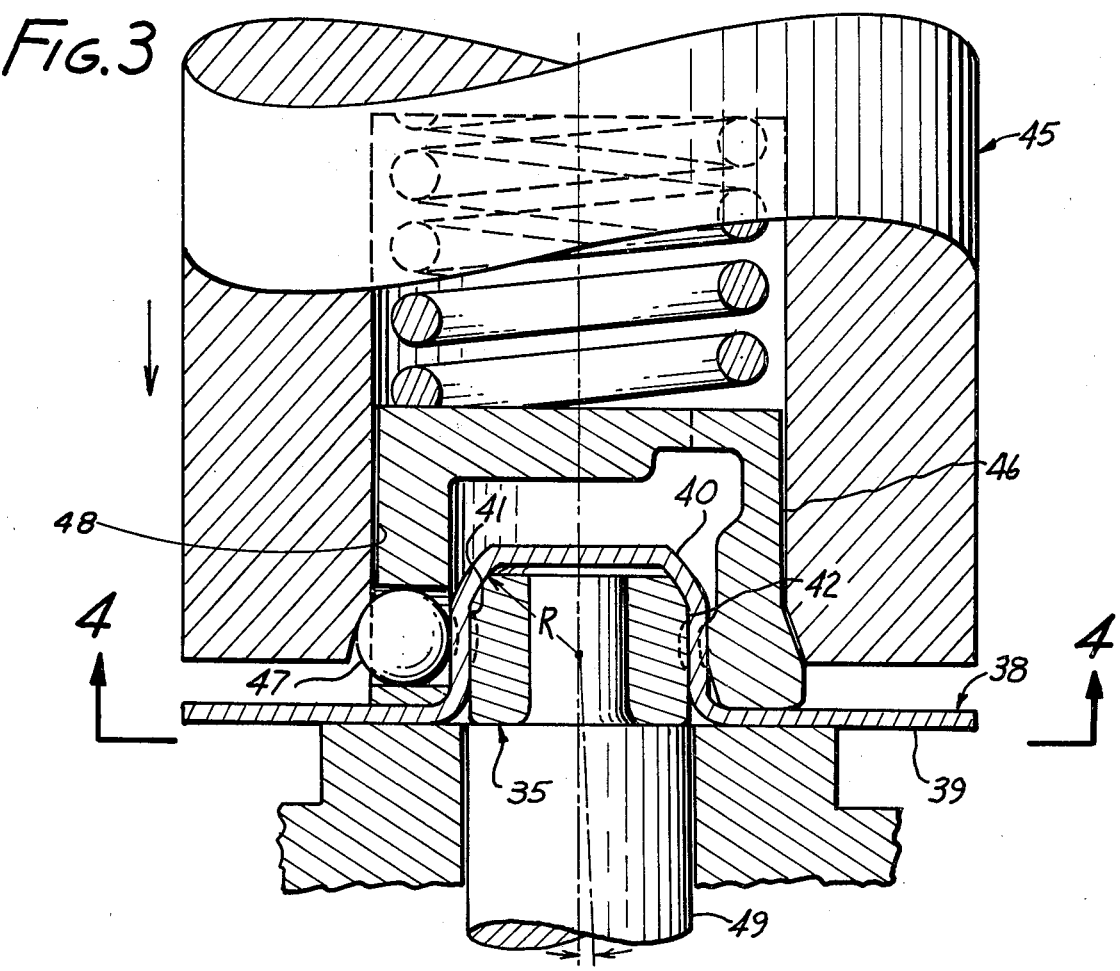
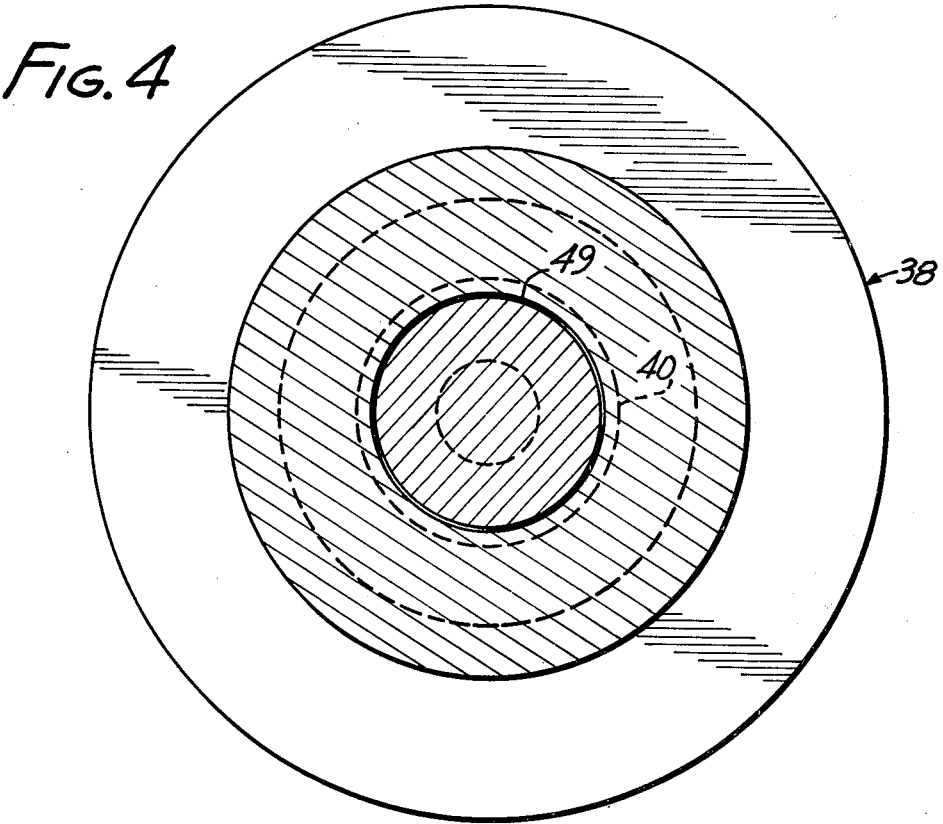

SELF ALIGNING PRESS IN BEARING STRUCTURES

FIELD OF THE INVENTION

This invention relates to self-aligning bearings, and especially to self-aligning bearings which can readily be mounted into end plates for motors.

BACKGROUND OF THE INVENTION

Sleeve-type bearings (as distinct from the rolling anti-friction type bearings) for electric motors and other rotating equipment are presently designed and assembled in supporting end frames using one or the other of two basically different types of bearing structure mounting systems: (1) Cylindrical O.D. press-in bearings rigidly retained by their press-fit assembly into cylindrical sockets in the end frames; and (2) Spherical O.D. self-aligning bearings adaptively mounted between a spherical seat in the end frames and a spring or other retaining element which itself is pressed in or otherwise affixed in the end structure.

The presently-known self-aligning bearing systems, with their complex retainer and assembly features, are themselves more costly and space consuming than simply cylindrical press-in bearing systems. Under adverse design, assembly, operation or maintenance conditions, conventional spherical bearings may tend to rotate in their self-aligning sockets—or may even become displaced out of their sockets by impacts or uneven drive loads.

Notwithstanding their cost and other limitations, the spherical self-aligning systems are often used instead of the simpler cylindrical press-in bearings because of overall motor alignment and cost considerations. For example, assembly and operation of motors with rigid press-in bearings—and with the usually desired small shaft-bearing clearances, and without disruptive shaft-bearing misalignments—requires a high degree of precision and rigidity throughout the motor, including all structural intermediates between the bearings on each end of the shaft. The cost or practicality of maintaining this precision and rigidity often dictates the use of self-aligning bearing systems. Also, it should be noted that these current systems will readily and inherently accommodate total misalignments of 15 degrees to 30 degrees or more; whereas, for all practical purposes for motors or similar rotary equipment, 1 or 2 degrees, or at the most about 5 degrees, is all that is really required to fully accommodate the total of fabrication and assembly tolerance limits.

A basic purpose of this invention is to provide new self-aligning bearing mounting systems which, along with special advantageous fabrication and assembly means, provide self-aligning capabilities sufficient to accommodate the relatively few degrees of re-alignment needed in most motors and rotary-type equipment—and in the same bearing mounting system also provide the advantages of low cost, easy assembly, economy of space, retention security, and other features inherent in the simple cylindrical press-in bearings.

BRIEF DESCRIPTION OF THE INVENTION

A self-aligning bearing according to this invention comprises a mounting member having a face, and in this face a receptacle with an inner peripheral wall having a nominal major diameter. A bearing member has an outer peripheral wall with a nominal major diameter, and is fitted inside the receptacle. The nominal diameters are approximately equal, but one of the walls is non-uniformly peripheral, with a portion making an interference fit with an opposite portion of the other of these walls. Accordingly, the bearing member is held in and restrained from rotating within the receptacle, but is enabled to tilt slightly so that the direction of the axis can be changed.

According to a preferred but optional feature of the invention, the non-uniformity is provided initially in one or in both of the walls.

According to another preferred but optional feature of the invention, the non-circularity is provided by forming the non-uniformity in one of said walls after the bearing has been placed in the receptacle.

The invention further contemplates a method wherein during or after insertion, the bearing member or the receptacle is gyrated so as to form axial extensions of interference structures on the outer diameter of the bearing.

The above and other features of this invention will be fully understood from the following detailed description and the accompanying drawings, in which:

BRIEF DESCRIPTION OF THE DRAWINGS

FIG. 1 is an end view of the presently preferred embodiment of the invention;

FIG. 2 is a cross-section taken at line 2—2 in FIG. 1;

FIG. 3 is an axial cross-section showing a means for assembling another embodiment of the invention;

FIG. 4 is an end view taken at line 4—4 in FIG. 3;

FIGS. 7 and 8 are side views of two bearing members, removed from the mounting member for purposes of illustration showing their shapes after the full assembly of the structure.

DETAILED DESCRIPTION OF THE INVENTION

Figure 6:
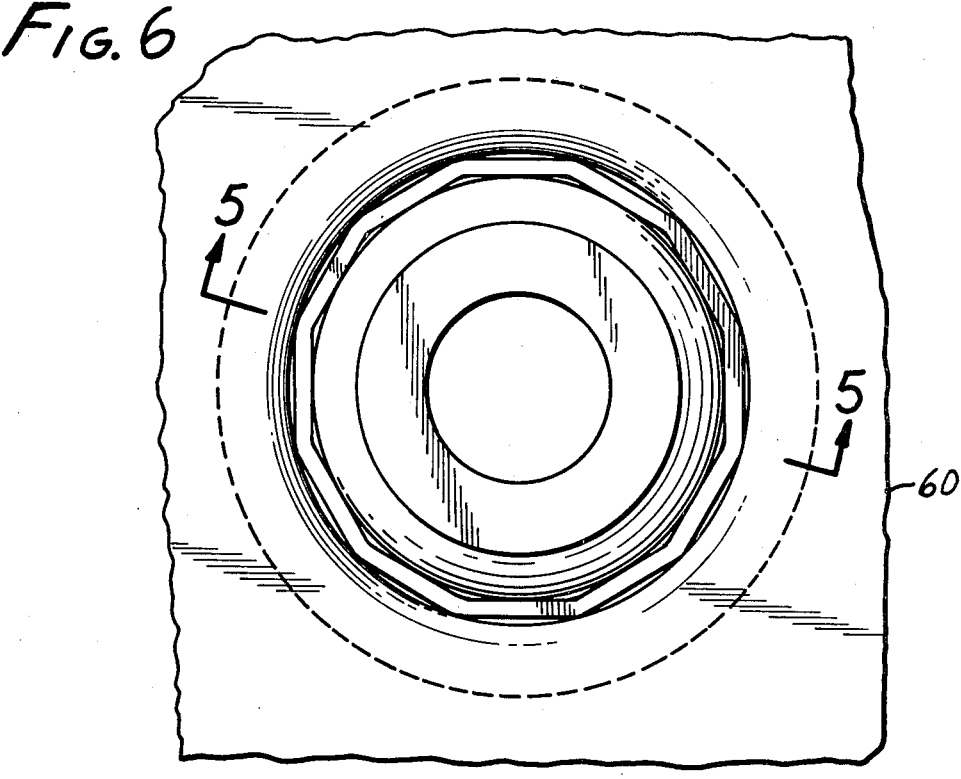
FIG. 6 is a top view of FIG. 5.

FIG. 1 shows a circular mounting member 20 with bolt holes 21 passing therethrough to accommodate mounting bolts and the like. The principal intended use for the structure shown in FIGS. 1 and 2 is as a bearing plate for the shaft of an electric motor. Of course there are other uses for this structure, and the mounting member can have any desired peripheral outline or may even be formed as a spider if preferred. In any event it acts to support a receptacle 22 which receives a bearing member 23. In dashed lines, the mounting plate is shown alternately formed in a dish shape, exemplifying the advantageous design latitude available with this invention, because its self-aligning structure requires only minimum space for bearing containment. This is in strong contrast with the larger and more complex containment structures for presently-known self-aligning bearings and their retainers.

The mounting member has a face 24, and the receptacle is formed in the face. It has an inner peripheral wall 25 with a nominal major diameter. Bearing member 23 as illustrated in FIGS. 2 and 7 is a truncated ball having a generally spherical outer peripheral wall 26 which may generally be divided into a central region 27 and two end regions 28 and 29. In some modifications of the invention, the central region may be cylindrical instead of spherical. In any event, the outer diameter of the bearing member in the central region, at least, is modified with non-circular configurations which engage matching configurations in the receptacle, and thereby preclude rotation of the bearing in its receptacle, while also allowing it to tilt to accommodate axial re-alignment to suit a shaft assembly which it supports. The bearing member will often be made of sintered or other relatively soft bearing material so as to be somewhat deformable, while the material of the receptacle will be harder, such as mild steel, so it can indent and reform the outside wall of the bearing member as it is pressed into the receptacle. This is a preferred method to generate the non-uniform circular configuration on the outer wall (outer diameter) of the bearing member. However, these non-circular features could instead be applied to the bearing before insertion into a receptacle whose inner wall already has matching non-circular shapes.

The outer peripheral wall 26 also has a nominal major diameter, and the nominal major diameters are approximately equal. The receptacle has a support portion 30 which may be a zone of a sphere with the same radius as that of region 28 to give axial support to the bearing member and permit it to rotate in the tilting sense.

As best shown in FIG. 1, one of walls 25 and 26 is initially non-uniformly peripheral. By this term is meant a non-circular periphery in a plane normal to the bearing axis. In FIG. 1 it will be seen that inner perhipheral wall 25 is somewhat polygonal, with "rounded" intersections and that its surfaces can readily be formed by a draw punch during the manufacture of the receptacle. The nominal major diameter is the largest diameter of the polygon, and the resulting flats 31 constitute a minor diameter. It will be seen that pressing the bearing member into the receptacle will cause the outer surface of the bearing to be modified (or "reformed") to conform at least in part to this structure in its central region. This deformation will cause the bearing member itself to be non-rotatable around its axis 32, but because the flats extend axially, limited angular movement of the axis itself is possible without destroying the non-circular features which prevent rotation of the bearing in the receptacle.

As one way to provide for this angular movement of the axis, while the bearing member is being pressed into the receptacle, it (or the receptacle itself) is gyrated, moving the axis around in a conical path with an included central conical angle of about 1 to 4 degrees, or somewhat more, depending on the maximum anticipated assembly misalignment. Thus, the accommodation of the surfaces of the bearing memer to the inside surface of the receptacle will be tolerant to that much angular change of alignment of the axis itself and will permit the bearing to be self-aligning to that degree and conform to a mis-aligned shaft.

FIGS. 1 and 2 illustrate that the bearing member may be forced into an already-formed relatively rigid receptacle. FIGS. 3 and 4 illustrate that the receptacle can be finally formed during the process of assembly, if preferred. For this latter type of assembly, and for some other applications as well, it may be preferable to provide the bearing member 35 with a central region 36 (see FIG. 8) which is cylindrical rather than spherical, and with an end region 37 provided with a spherical radius, similar to region 28 in FIG. 1. Mounting member 38 has a face 39 and a receptacle 40. The receptacle 40 has an inner peripheral wall 41 with a nominal major diameter. A sintered or other soft-metal bearing member 35 has an outer peripheral wall 42 with a slightly larger major diameter in region 36. Thus, the bearing can be inserted into the receptacle.

Next, a tool 45 is placed over the outside of the receptacle. The tool may have two configurations which are shown alternatively at the left and right hand portions of FIG. 3. It may in one form have a plurality of flexible fingers 46 angularly spaced apart from one another, or may instead have a plurality of balls 47. In either case, a collet 48 is brought down over these to press them against the outer wall of the receptacle and deform the receptacle so as to deform and press segments of the inner wall of the receptacle against and into the outer wall of the bearing. During or after this time the bearing, in relation to its receptacle, will be gyrated by means of inserting a shaft 49 into it and moving the shaft axis in a conical path with an included angle of between about 1 and about 4 degrees. Thus there will be formed in the receptacle member a plurality of internal protrusions which will in turn form axially extending indentations 50 in the bearing member itself. The indentations in the bearing are, of course, made somewhat longer along axial lines than the internal protrusions so as to accommodate the self-alignment tilting between the bearing and its receptacle. After assembly, the tool is removed and the bearing is complete.

The embodiment of FIGS. 3 and 4 illustrates that with the special blind-hole embossing tool 45, instead of providing interference patterns over an extended length of the bearing-receptacle assembly, it is possible to provide the adaptive detent features in "blind-hole" fashion in the assembly's mid-section. Other versions of the special tool devised for gyrating the bearing-receptacle relationship during or after the bearing press-in assembly operation can readily be devised. The tool can be designed as shown to gyrate the bearing while the receptacle is stationary, or to gyrate the receptacle with the bearing held stationary. In either case, to provide for the desired axial re-alignment with minimum disruption of the non-circular detents against rotation, it is important that the gyrating axis and the stationary axis cross each other at or near the tri-axial center of the bearing, i.e., at the bearing axis where it intersects a plane centered through the non-circular detent features, if these features are not located at the bearings mid-section. It is also desirable to have the gyrating fixture holding the bearing (or the receptacle structure) rotate freely on its gyrating axis. This avoids rotation of the fixture shaft in the bearing ID, and thus minimizes any possibility of "bell-mouthing" the bearing during gyration.

Figure 5:
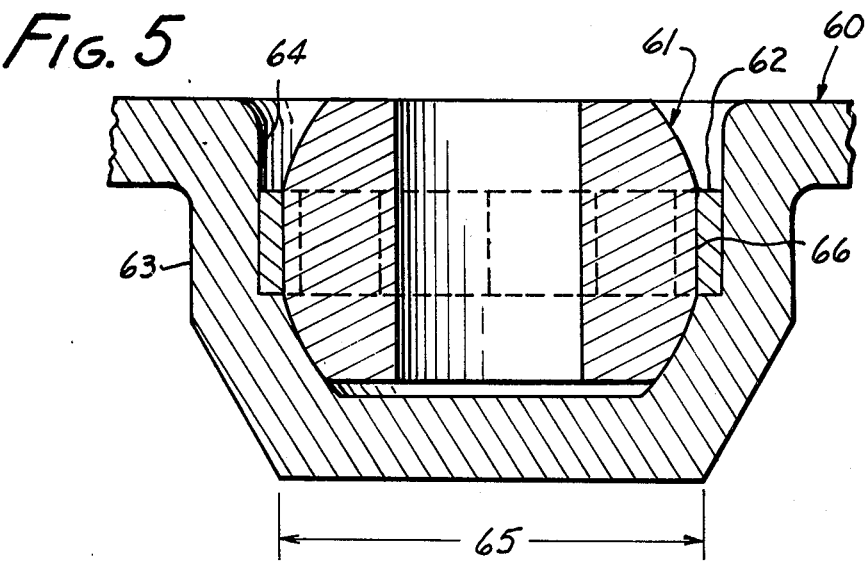
FIG. 5 is a cross-section taken at line 5—5 in FIG. 6, showing still another embodiment of the invention.

FIGS. 5 and 6 illustrate that the mounting member 60 need not serve as the direct support for the bearing member 61 but instead an intermediate retainer member 62 may be placed between them. For purposes of definition herein, the intermediate retainer member will be regarded and discussed as being a part of the mounting member. However, as shown, the mounting member itself may if desired be made of plastic or other material less readily formed than the moldable steels used in the embodiments of FIGS. 1 and 3, and may for example be plastic, die cast metal, cast iron, or other material. This embodiment includes a receptacle 63 which holds the retainer member. The retainer member has a non-uniformly circular inner wall 64 as in the other embodiments, wiht a nominal major diameter 65 in the same sense as the embodiment of FIG. 1. The bearing member 61 has an outer peripheral wall 66 with a nominal major diameter and is pressed into the retainer member in the same manner as accomplished in either of the previous two embodiments. It may be either spherical as in FIG. 1 or cylindrical as in FIG. 3, as preferred. The retainer member itself may be held in the receptacle by being molded or otherwise fixed therein.

A comparison of the various embodiments will show that the non-uniformly circular adaptive detent structures can be either provided in an existing receptacle before insertion and re-forming of the bearing member or may be formed after the bearing member is inserted. Furthermore while flats as shown in FIG. 1 will generally be preferred, discontinuities such as points, lines or ribs function suitably, as for example the embossed construction provided by the technique shown in FIGS. 3 and 4.

It will further be understood that the construction of the end regions on the bearing members is optional. It is useful and preferable for them to have a spherical radius, and for the receptacle to have a matching radius to provide for fixed axial positioning under thrust loads without restricting the self-aligning action. However it is also possible simply to recess these portions to permit the self-aligning angular deflections of the bearing without providing any axial bearing contact at the end of the receptacle.

It will also be understood that the assembly of the device need not be accompanied by gyration of the axis. The gyration technique is preferred and useful, and prepares the bearing for its later accommodations. However, this is not necessary if re-forming of the bearing by receptacle detents is not unduly severe, and the bearing member is simply pressed into the receptacle. After such installation and a few vibrations and/or revolutions of the shaft, the necessary aligning movement of the bearing member will have occurred and will have created the same self aligning bearing structure as would be made by the assembly techniques shown, although self-alignment freedom is created only to the extent required for the particular installation.

This invention thereby provides useful bearing assemblies which are inherently self-aligning, along with improved fabrication and assembly techniques which facilitate high volume, low cost production type operations.

The major outer diameter of the non-circular feature and the bearings are best made greater than the matching ID features of the receptacle in order to provide "spline-type" restraint against rotation of the bearing. However, there may instead be a slight clearance between the minor or root diameters of the two matching parts—the extent of this being a matter of choice dependent upon such factors as relative requirements for angular freedom versus restraint against rotation.

This invention is not to be limited to the embodiments shown in the drawings and described in the description which are given by way of example and not of limitation, but only in accordance with the scope of the appended claims.

We claim:

1. A self-aligning press-in bearing structure comprising: a mounting member having a face, and in the face a receptacle, said receptacle being concave and open at one end, and having an inner peripheral wall with a nominal diameter; and a bearing member adapted to receive a shaft and accommodate itself to the axis of said shaft when the angle between said axis of the shaft and a nominal axis of said bearing member is of the order of about 5° or less, said bearing member having an outer wall which in a central region has a nominal major diameter approximately equal to that of the said inner wall, said inner and outer walls having noncircular portions making with one another at least a net fit, whereby to permit only limited rotation of said bearing in planes including said axis, and substantially preventing rotation of said bearing around said axis, both of the limitations being exerted at said diameters where the radial load is reacted, resistance to the axial load thereby being exerted only by the receptacle.

2. A bearing structure according to claim 1 in which said non-circular portions are formed initially in said receptacle, and said non-circular portions in said bearing member are formed as a consequence of interference between said receptacle and said bearing member.

3. A bearing structure according to claim 2 in which the material of the bearing member is more malleable than the material of said receptacle.

4. A bearing structure according to claim 2 in which the said non-circular portions of said receptacle were formed prior to insertion of said bearing member.

5. A bearing structure according to claim 4 in which the material of the bearing member is more malleable than the material of said receptacle.

6. A bearing structure according to claim 4 in which said non-circular portions on said bearing member were in part formed by gyration of said bearing member around its center.

7. A bearing structure according to claim 2 in which both sets of said non-circular portions were formed after insertion of said bearing member into said receptacle.

8. A bearing structure according to claim 7 in which the material of the bearing member is more malleable than the material of said receptacle.

9. A bearing structure according to claim 7 in which said non-circular portion on said bearing member are in part formed by gyration of said bearing member around its center.

10. A bearing structure according to claim 1 in which a portion of said inner peripheral wall and a portion of said outer wall are zones of spheres which engage one another to restrain said bearing member against axial movement in one direction, and to guide said limited rotation.

11. A bearing structure according to claim 1 in which said central region of said bearing member is the zone of a sphere, modified by its said non-circular portions.

12. A bearing structure according to claim 1 in which central region of said bearing member is substantially cylindrical, modified by its said non-circular portions.

13. A bearing structure according to claim 1 in which an intermediate retainer member is interposed between said bearing member and said receptacle, carrying said non-circular portions respective to said retainer on a surface contiguous to the outside of said bearing member.

14. The method of making a bearing structure which structure includes a mounting member having a face, and in the face a receptacle, said receptacle being concave and having an inner peripheral wall with a nominal diameter; and a bearing member adapted to receive a shaft and accommodate itself to the axis of said shaft when the angle between said axis of the shaft and a nominal axis of said bearing member is of the order of about 5° or less, said bearing member having an outer wall which in a central region has a nominal diameter approximately equal to that of the said inner wall, said inner and outer walls having matching non-circular portions permitting limited rotation of said bearing in planes including said axis, and substantially preventing rotation of said bearing around said axis, said method comprising: pressing said bearing into said receptacle to form an interference fit, and relatively gyrating said mounting member and bearing member to modify said interference fit to permit said accommodation.

15. The method of claim 14 in which said receptacle member and bearing member are initially round, and in which they are simultaneously pressed out of round, the bearing member being sufficiently malleable, prior to said gyration.

16. The method of claim 14 in which said innner wall is initially non-circular, and the bearing member malleable, said bearing member being pressed into said receptacle and its outer wall deformed out of round by said inner wall, previous to said gyration.

* * * * *